US008854379B2

(12) United States Patent
Conte et al.

(10) Patent No.: US 8,854,379 B2
(45) Date of Patent: Oct. 7, 2014

(54) ROUTING ACROSS MULTICORE NETWORKS USING REAL WORLD OR MODELED DATA

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1204 days.

(21) Appl. No.: 12/392,903

(22) Filed: Feb. 25, 2009

(65) Prior Publication Data

US 2010/0217955 A1    Aug. 26, 2010

(51) Int. Cl.
*G06F 15/16* (2006.01)
*G06F 15/80* (2006.01)
*G06F 9/50* (2006.01)
*G06T 1/20* (2006.01)

(52) U.S. Cl.
CPC .............. *G06F 9/5066* (2013.01); *G06T 1/20* (2013.01); *G06T 2210/52* (2013.01)
USPC ............................ 345/502; 345/503; 345/505

(58) Field of Classification Search
CPC ............................. G06T 1/20; G06T 2210/52
USPC ......................... 345/501–522; 712/10, 28, 29
See application file for complete search history.

(56) References Cited

U.S. PATENT DOCUMENTS

| | | | | |
|---|---|---|---|---|
| 5,649,198 A * | 7/1997 | Shibata et al. | ................ | 718/100 |
| 5,963,211 A * | 10/1999 | Oikawa et al. | ................ | 345/424 |
| 6,304,266 B1 * | 10/2001 | Li | ................ | 345/424 |
| 6,313,838 B1 * | 11/2001 | Deering | ................ | 345/420 |
| 6,437,796 B2 * | 8/2002 | Sowizral et al. | ............... | 345/622 |
| 6,459,429 B1 * | 10/2002 | Deering | ................ | 345/423 |
| 6,587,110 B1 * | 7/2003 | Kunimatsu et al. | ........... | 345/502 |
| 6,704,018 B1 * | 3/2004 | Mori et al. | .................... | 345/502 |
| 6,757,448 B2 | 6/2004 | Sasaki | | |

(Continued)

FOREIGN PATENT DOCUMENTS

| EP | 08-82428 | 12/1998 |
|---|---|---|
| JP | 62-049557 | 4/1987 |

(Continued)

OTHER PUBLICATIONS

Bethel, E.W.; Humphreys, G.; Paul, B.; Brederson, J.D.; , "Sort-first, distributed memory parallel visualization and rendering," Parallel and Large-Data Visualization and Graphics, 2003. PVG 2003. IEEE Symposium on , vol., No., pp. 41-50, 21-21 Oct. 2003.*

(Continued)

*Primary Examiner* — David T Welch
(74) *Attorney, Agent, or Firm* — Dorsey & Whitney LLP

(57) ABSTRACT

The present disclosure relates to a system for routing data across a multicore processing network. The system includes a multicore processing array having a plurality of processing cores, a memory for storing data relating to an object being modeled, the data being associated with coordinate information relating to the object within a coordinate system, and a controller for routing the data from the memory to one or more of the plurality of processing cores of the multicore processing array based on the coordinate information associated with the data. The present disclosure also relates to a method for routing data across a multicore processing network and a computer accessible medium having stored thereon computer executable instructions for performing a procedure for routing data across a multicore processing network.

22 Claims, 7 Drawing Sheets

(56) References Cited

U.S. PATENT DOCUMENTS

| | | | |
|---|---|---|---|
| 7,071,935 B1* | 7/2006 | Deering et al. | 345/419 |
| 7,075,541 B2* | 7/2006 | Diard | 345/505 |
| 7,915,756 B2 | 3/2011 | Ikeda | |
| 8,155,456 B2* | 4/2012 | Babacan et al. | 382/232 |
| 2001/0055019 A1* | 12/2001 | Sowizral et al. | 345/441 |
| 2004/0125111 A1* | 7/2004 | Tang-Petersen et al. | 345/506 |
| 2004/0130552 A1* | 7/2004 | Duluk et al. | 345/506 |
| 2004/0263520 A1* | 12/2004 | Wasserman et al. | 345/506 |
| 2005/0012749 A1* | 1/2005 | Gonzalez et al. | 345/522 |
| 2008/0001952 A1* | 1/2008 | Srinivasan et al. | 345/502 |
| 2008/0080789 A1 | 4/2008 | Marks et al. | |
| 2009/0041448 A1* | 2/2009 | Georgiev et al. | 396/268 |

FOREIGN PATENT DOCUMENTS

| | | |
|---|---|---|
| JP | 01-156860 | 6/1989 |
| JP | 01-156861 | 6/1989 |
| JP | 01-156862 | 6/1989 |
| JP | 02-197951 | 8/1990 |
| JP | 03-232055 | 8/1990 |
| JP | 06-243113 | 9/1994 |
| JP | 09-016805 | 1/1997 |
| JP | 2006-261949 | 9/2006 |
| JP | 2007-503059 | 2/2007 |
| JP | 2008-158836 | 7/2008 |
| KR | 10-2002-003969 | 5/2002 |

OTHER PUBLICATIONS

Wentzlaff, D.; Griffin, P.; Hoffmann, H.; Liewei Bao; Edwards, B.; Ramey, C.; Mattina, M.; Chyi-Chang Miao; Brown, J.F.; Agarwal, A.; , "On-Chip Interconnection Architecture of the Tile Processor," Micro, IEEE , vol. 27, No. 5, pp. 15-31, Sep.-Oct. 2007.*

Antonio Plaza et al, "Commodity cluster-based parallel processing of hyperspectral imagery", Journal of Parallel and Distributed Computing, vol. 66, Issue 3, Mar. 2006, pp. 345-358.*

* cited by examiner

ROUTING ACROSS MULTICORE NETWORKS USING REAL WORLD OR MODELED DATA

BACKGROUND

Numerous existing processor architectures support parallel processing. The earliest such architectures used multiple discrete processors networked together. More recently, multiple processing cores have been fabricated on a single integrated chip. Some multicore processors have been developed for accelerating particular applications, such as physical simulation or graphics applications. In multicore processing, data is distributed to particular processing cores as the data is read from memory. In many cases, the distribution to the processing cores is not balanced, and some cores may be overused while others are underused.

SUMMARY

In one embodiment, the present disclosure relates to a system for routing data across a multicore processing network. The system includes a multicore processing array having a plurality of processing cores, a memory for storing data relating to an object being modeled, the data being associated with coordinate information relating to the object within a coordinate system, and a controller for routing the data from the memory to one or more of the plurality of processing cores of the multicore processing array based on the coordinate information associated with the data.

In variations of this embodiment, the controller can include a spatial transform which transforms the coordinate information to routing information relating to one or more of the plurality of processing cores. In some embodiments, the coordinate information comprises two-dimensional coordinate information, three-dimensional coordinate information, or more than three dimensions. In one embodiment, one of the dimensions is time, and the routing information is time dependent, such that routing to one or more processing cores changes over time. The system for routing data across a multicore processing network can further include a network of switches interconnecting the plurality of processing cores, and the routing information can define the path through the switches for which the data will be routed from the memory to the one or more of the plurality of processing cores. In some embodiments, the object being modeled is an object in a physics simulation, and the routing of data relating to the object changes as the physical location of the object changes in the physics simulation. In further embodiments, one or more image sensors are used to capture data relating to the object.

In another embodiment, the present disclosure relates to a method for routing data across a multicore processing network. The method includes storing one or more data relating to an object being modeled in memory, each of the one or more data being associated with coordinate information relating to the object within a coordinate system, retrieving data from the memory relating to the object, and routing the data retrieved from memory to one or more processing cores of a multicore processing array based on the coordinate information associated with the data.

In variations of this embodiment, routing the data retrieved from memory to one or more processing cores can include using a spatial transform which transforms the coordinate information to routing information relating to one or more of the plurality of processing cores. In some embodiments, the coordinate information comprises two-dimensional coordinate information or three-dimensional coordinate information. In another embodiment, the routing information relating to one or more of the plurality of processing cores is time dependent, such that routing to one or more processing cores changes over time. The method for routing data across a multicore processing network can further include routing the data using a network of switches interconnecting the plurality of processing cores, and the routing information defines a map for routing the data through the switches from the memory to the one or more of the plurality of processing cores. In one embodiment, the object being modeled is an object in computational photography, and the routing of data relating to the object changes as the physical location of the object changes in the computational photography.

In yet another embodiment, the present disclosure relates to a computer accessible medium having stored thereon computer executable instructions for performing a procedure for routing data across a multicore processing network. The procedure includes retrieving, from memory, data relating to an object being modeled, wherein the data is associated with coordinate information relating to the object within a coordinate system, and routing the data retrieved from memory to one or more processing cores of a multicore processing array based on the coordinate information associated with the data.

In variations of this embodiment, routing the data retrieved from memory to one or more processing cores can be done using a spatial transform which transforms the coordinate information to routing information relating to one or more of the plurality of processing cores. In further embodiments, the routing information relating to one or more of the plurality of processing cores may be time dependent, such that routing to one or more processing cores changes over time. In certain embodiments, the object being modeled may be an object of a real-time control application, and the routing of data relating to the object changes as the physical location of the object changes.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
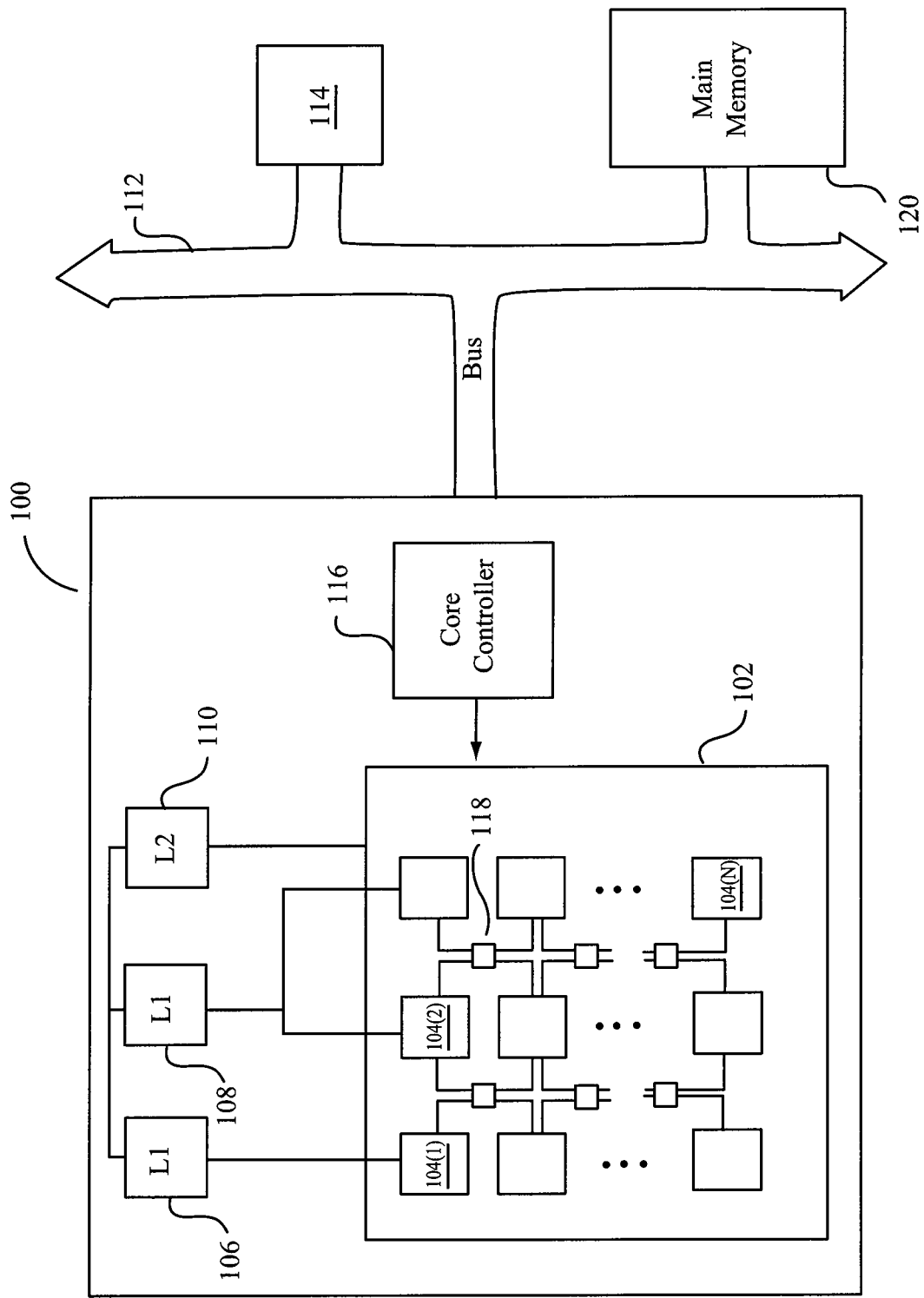
FIG. 1 is a schematic of an illustrative embodiment of a multicore processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Additionally, some well-known structures, circuits, techniques, and the like have not been described in detail, to avoid unnecessarily obscuring the disclosure.

In multicore processing, data is distributed to particular processing cores as the data is read from memory, external sensors, or other components of the computing environment, such as but not limited to, I/O devices or other components connected to the Central Processing Unit (CPU) by buses. Data to be processed can be distributed to the processing cores in various ways. In many cases, the distribution to the processing cores is not balanced, and some cores may be overused while others are underused. That is, in may cases, some fraction of available processing cycles may be effectively wasted. Additionally, during some processing tasks, such as but not limited to processing for physics simulations, an object being modeled may move throughout some coordinate system.

In order to increase efficiency and parallelism of multicore processing, for example, during physical simulation or graphics acceleration, systems and methods are described herein for parallel array architecture for spatially mapped multicore processing. The systems and methods described herein can route data or data processing tasks across the network of processing cores of a multicore processor using "real-world" or modeled data. Routing data or data processing tasks may include tagging the data with its coordinate location information and using the coordinate information to guide its route through the network of processing cores to its destination core. Spatially mapping multicore processing can route data relating to an object being modeled based on the most recent location of object in, for example, a coordinate system. Thus, in one embodiment of the present disclosure, data that relate to objects relatively near each other in a coordinate system may be processed relatively near each other by the multicore processor.

Figure 1B:
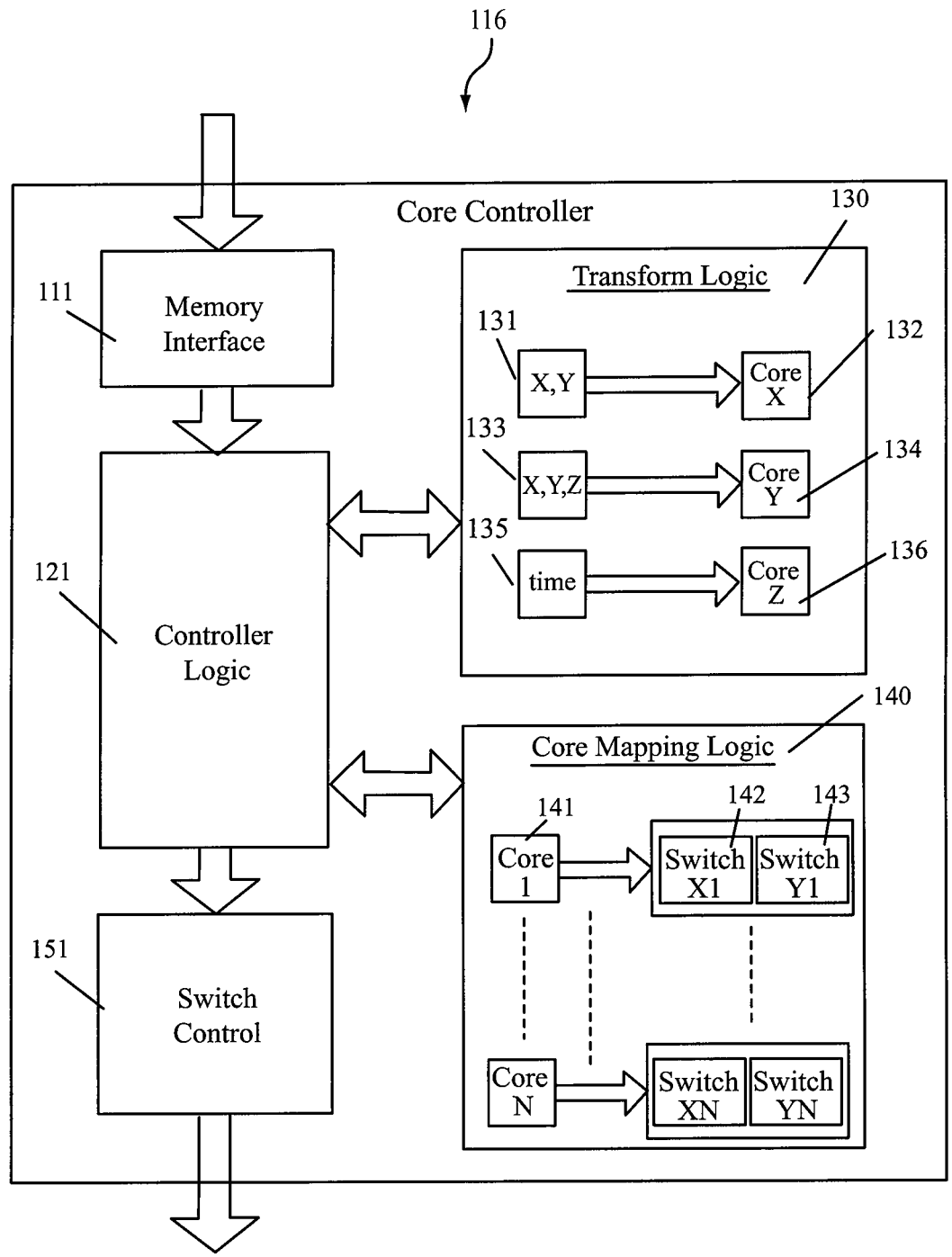

FIG. 1 shows an illustrative multicore processor 100, including a single integrated circuit having a processing core array 102. In other embodiments a multicore processor may include processors on separate integrated chips. The processing core array 102 can include some number (N) of processing cores 104(1)-104(N). Any suitable number of processing cores 104 may be provided. A processing core 104 can include logic for executing program instructions.

The multicore processor 100 may include any combination of dedicated or shared resources. A dedicated resource may be a resource 106 dedicated to a single processing core 104, such as a dedicated level one cache, or may be a resource 108 dedicated to any subset of the processing cores 104. A shared resource may be a resource 110 shared by all of the cores 104, such as a shared level two cache or a shared external bus 112 supporting an interface between the multicore processor 100 and another component 114, such as but not limited to I/O devices, external sensors, or the like, or may be a resource shared by any subset of the processing cores 104. A shared resource may also include main memory 120, which may be any suitable form of memory including, but not limited to, RAM, ROM, flash storage, magnetic disk storage, tape storage, optical storage, or other machine-readable storage mediums.

As stated above, multicore processor 100 may have any suitable number of processing cores 104. For example, multicore processor 100 may have two (2) cores, four (4) cores, tens of cores, and even hundreds or more of processing cores. Some multicore processors may be homogenous, such that each of the processing cores use a single core design. Other multicore processors may be heterogeneous, such that one or more of the processing cores may be different from one or more of other processing cores, and each core or subset of cores may be optimized for a different role in the multicore processor 100.

The multicore processor 100 may include a core controller, or core interface 116. Core controller 116 may determine which processing tasks are to be processed by each processing core 104. One or more switches 118 may be provided. In one embodiment, processing tasks may be routed to selected processing cores using switches 118.

FIG. 1 is an illustrative schematic of a multicore processor and does not illustrate physical location of the components illustrated therein. It is appreciated that the multicore processor 100 described herein is illustrative and that variations and modifications are possible. Design choices may be driven by, for example, considerations of hardware size and complexity versus performance.

As may be appreciated by one skilled in the art, the multicore processor 100 may be provided in a suitable computing environment, such as a personal computer. A computing environment can include the multicore processor 100, system memory, one or more buses, and one or more I/O devices, such as a keyboard, mouse, touch screen, display device, such as a conventional CRT or LCD based monitor, USB or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A personal computer may operate in a networked environment using logical connections to one or more remote computers. Such remote computers may be, for example, other personal computers, servers, routers, network PCs, peer devices, or other common network nodes. Logical connections may comprise, for example, a local-area network (LAN) or a wide-area network (WAN).

Figure 2:
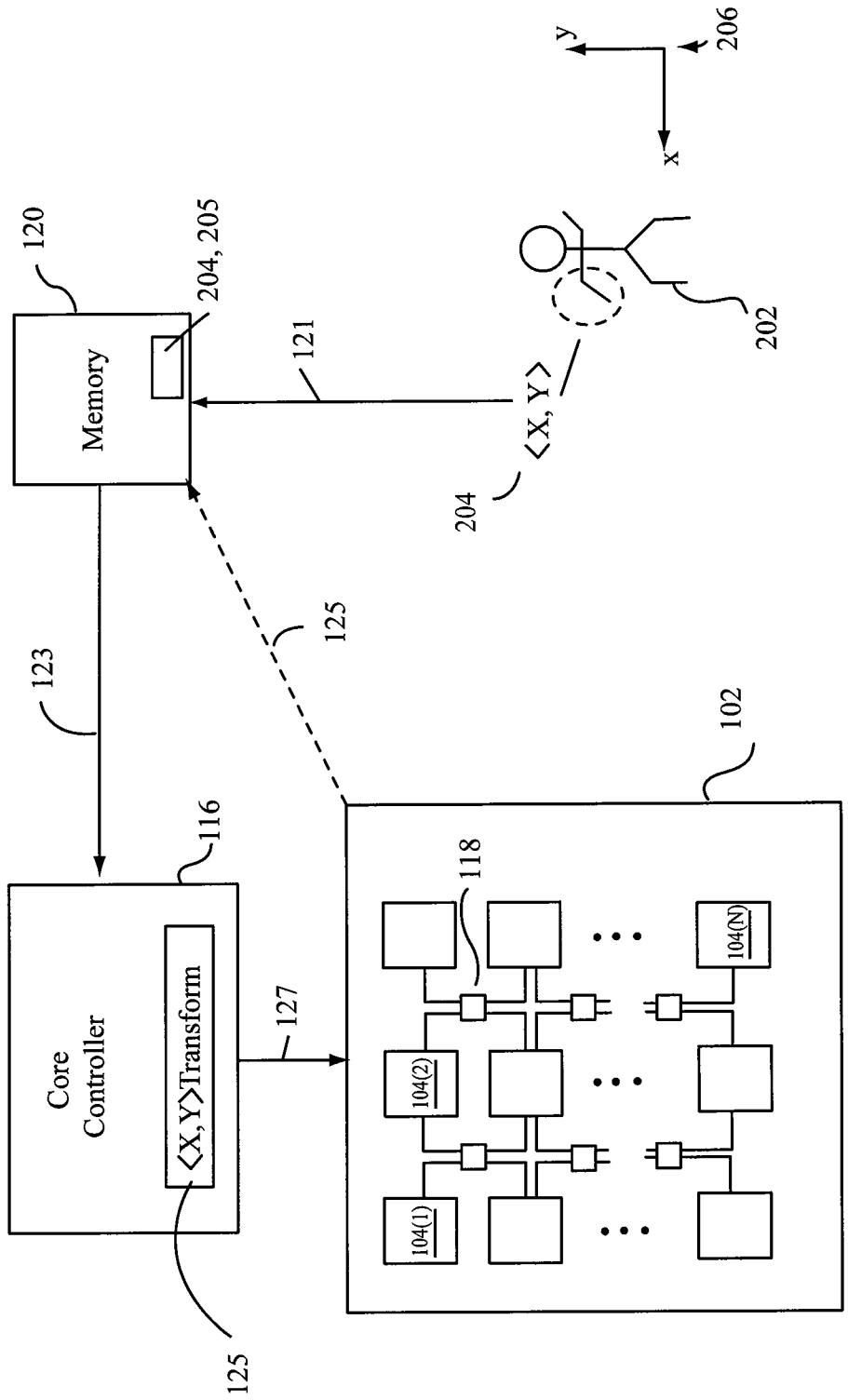
FIG. 2 is a schematic of a parallel array architecture for spatially mapped multicore processing according to one embodiment of the present disclosure.

FIG. 2 illustrates a parallel array architecture for spatially mapped multicore processing in accordance with one embodiment. As is illustrated in FIG. 2, data relating to an object 202, or portion of an object, being modeled may be stored in memory 120 and associated with its coordinate information 204, such as but not limited to, its <X,Y> coordinate information. The object 202 being modeled may be any object in the real world, or otherwise any real-life object or model of a real-life object, such as but not limited to, objects in video, computational photography, real-time control applications, physics simulations, or the like, or the object 202 being modeled may be any object in an artificial environment, such as but not limited to, an object in a video game, physics simulation, or other application. The coordinate information 204 may relate to the physical position, e.g., real-life or real-world physical position or artificial position, of the object 202, or portion of the object, within a specified coordinate system 206.

The data relating to the object 202 being modeled may be retrieved from the memory 120 when requested for processing by the multicore processor array 102. In one embodiment, the data may be sent to one or more cores 104 for processing via the core controller 116. The core controller 116 may determine which processing tasks are to be processed by each processing core 104. In one embodiment, the core controller 116 may include hardware and/or software for transforming or translating the coordinate information 204 associated with data retrieved from the memory 120 to information relating to which processing core 104 will perform processing tasks related to the retrieved data. In one embodiment, processing tasks may be routed to selected processing cores using one or more switches 118. Generally, the coordinate information 204 associated with particular data relating to the object 202 being modeled may be used to guide the data's route through the network of switches 118 to the processing core 104 selected for processing tasks associated with the data.

In one embodiment, given the <X,Y> coordinates of any point or portion of the object being modeled, the <X,Y> coordinates can be used to spatially map the data for that point of the model to a particular processing core, wherein the routing is based on a calculation that is distributed on some <X',Y'> transform model. Thus, efficiency and processing speed of a multicore processor can be increased. In some embodiments, the increase in efficiency and processing speed of a multicore processor can be beneficial for, or beneficially adapted for use with, real-time control or real-time physics simulation, such as for controlling objects or modeling objects in movement.

Figure 3:
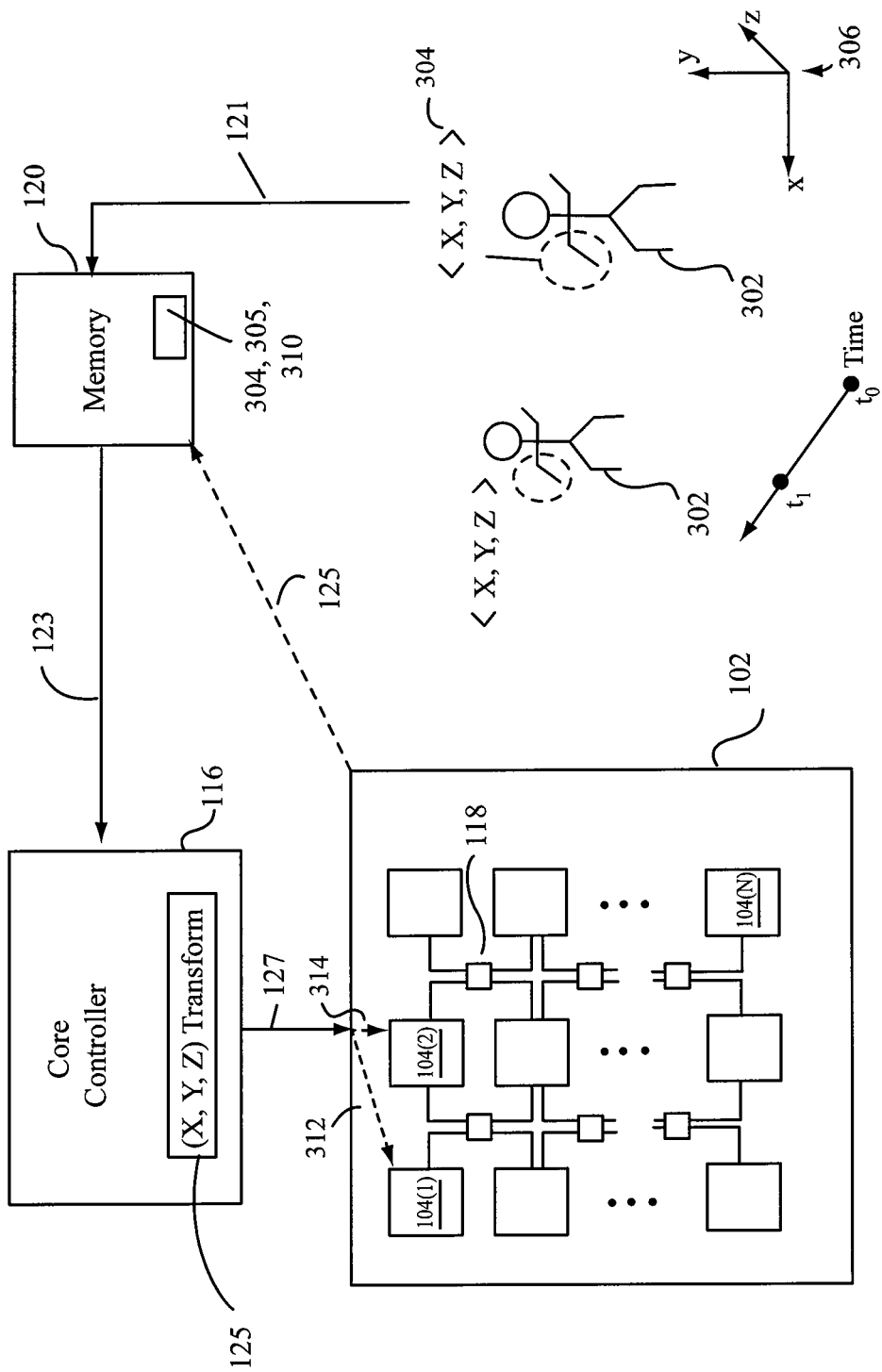
FIG. 3 is a schematic of a parallel array architecture for spatially mapped multicore processing according to another embodiment of the present disclosure.

As illustrated in FIG. 3, a parallel array architecture for spatially mapped multicore processing according to another embodiment of the present disclosure can be extended to three-dimensional (3D) models 302 or an otherwise 3D coordinate system. In one embodiment, data relating to an object 302, or portion of an object, being modeled in a 3D coordinate system may be stored in memory 120 and associated with its coordinate information 304, such as but not limited to, its <X,Y,Z> coordinate information. The coordinate information 304 may relate to the physical position, real or artificial, of the object 302, or portion of the object, within a specified coordinate system 306. The <X,Y,Z> coordinates can be used to spatially map the data for that point of the model to a particular processing core, wherein the routing is based on a calculation that is distributed on some <X',Y',Z'> transform model. In one embodiment, the core controller 116 may include the hardware and/or software for transforming or translating the coordinate information 304 associated with data retrieved from the memory 120 to information relating to which processing core 104 will perform processing tasks related to the retrieved data.

In another embodiment, as also illustrated in FIG. 3, a dimension for time 310 may be introduced, such that the spatially mapped routing of processing to the processing cores 104 of the multicore processor 102 can also change over time. For example, at time $t_0$, processing associated with the coordinates $<X_1, Y_1, Z_1>$ may be spatially mapped to, for example, processing core 104(1), (see 312) while at time $t_1$, processing associated with the same coordinates $<X_1, Y_1, Z_1>$ may be spatially mapped to, for example, processing core 104(2), (see 314). Mapping lines 312 and 314 are for conceptual illustration purposes, and it is recognized that the core controller 116 may route the data associated with coordinates $<X_1, Y_1, Z_1>$ in any suitable manner, such as through switches 118, as described above. In further embodiments, the spatially mapped routing may be time dependant as a result of a model predicting how the simulation or physical world will change in the future. As an illustrative example only, during a physical simulation, a model may be used to predict the manner in which an object (e.g., a deformed part in a car) will ultimately buckle and break during a simulated car crash. The spatially mapped routing of processing to the processing cores 104 may be based on the coordinates and timing components of the model.

In yet further embodiments, any additional even or uneven processing distribution techniques may be used in combination with, or on top of, the various embodiments of spatially mapped processing described herein.

Figure 4:
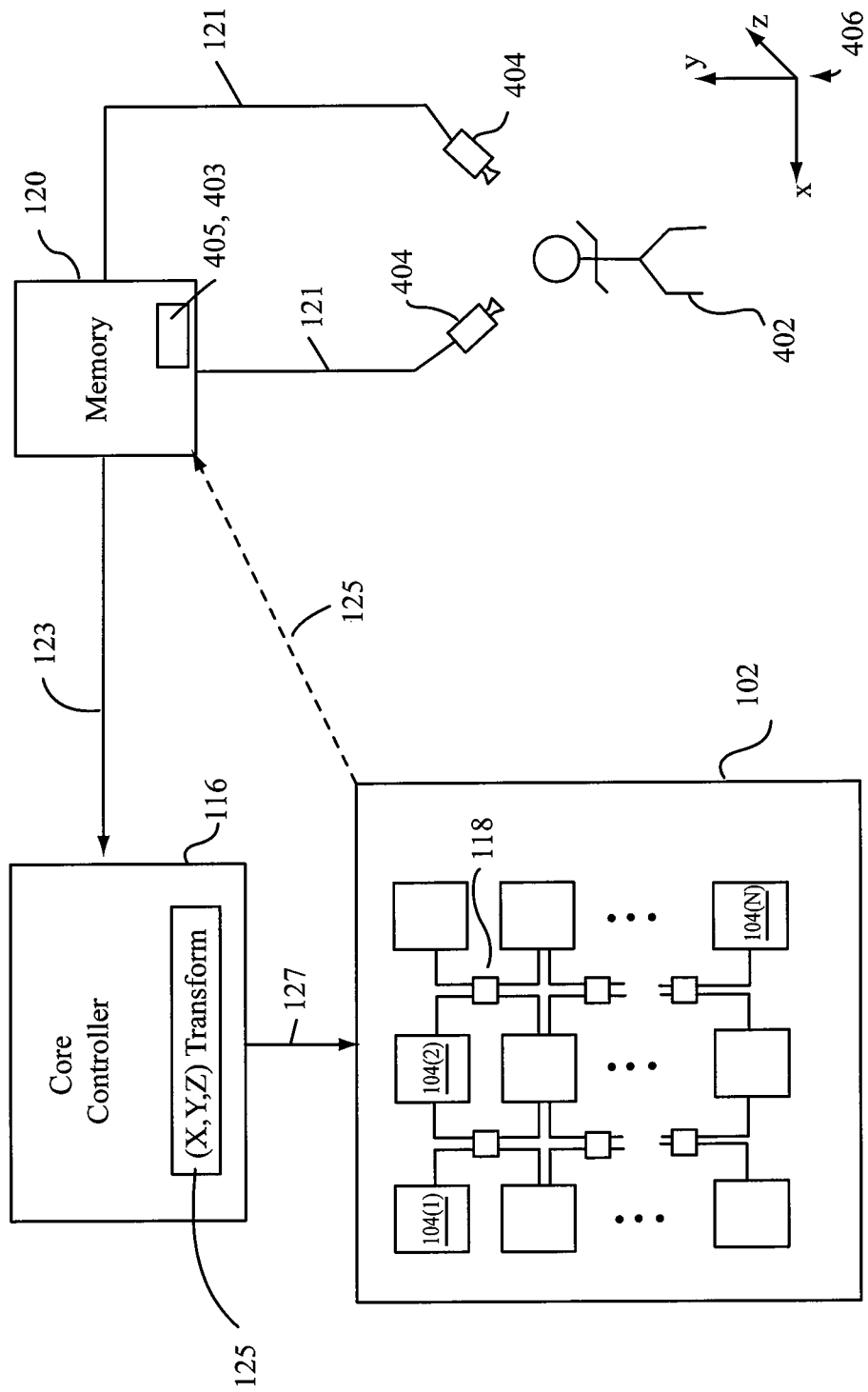
FIG. 4 is a schematic of a parallel array architecture for spatially mapped multicore processing in computational photography according to yet another embodiment of the present disclosure.

In a further embodiment, illustrated in FIG. 4, a parallel array architecture for spatially mapped multicore processing according to the present disclosure can be used for computational photography. Generally, computational photography uses image sensors and software to create images that cameras cannot readily capture on their own. Similar to the previous embodiments, in one embodiment used for computational photography, data relating to an object 402, or portion of an object, being modeled may be stored in memory 120 and associated with its coordinate information, such as but not limited to, its <X,Y,Z> coordinate information. The data relating to the object 402, or portion of the object, may be captured or retrieved by a one or more pictures from one or more image sensors 404, photography cameras, video cameras, or other similar devices. The coordinate information may relate to the physical position of the object 402, or portion of the object, within a specified coordinate system 406. The <X,Y,Z> coordinates can be used to spatially map the data for that point of the model to a particular processing core, wherein the routing is based on a calculation that is distributed on some <X',Y',Z'> transform model. In one embodiment, the core controller 116 may include the hardware and/or software for transforming or translating the coordinate information associated with data retrieved from the memory 120 to information relating to which processing core 104 will perform processing tasks related to the retrieved data.

Figure 5:
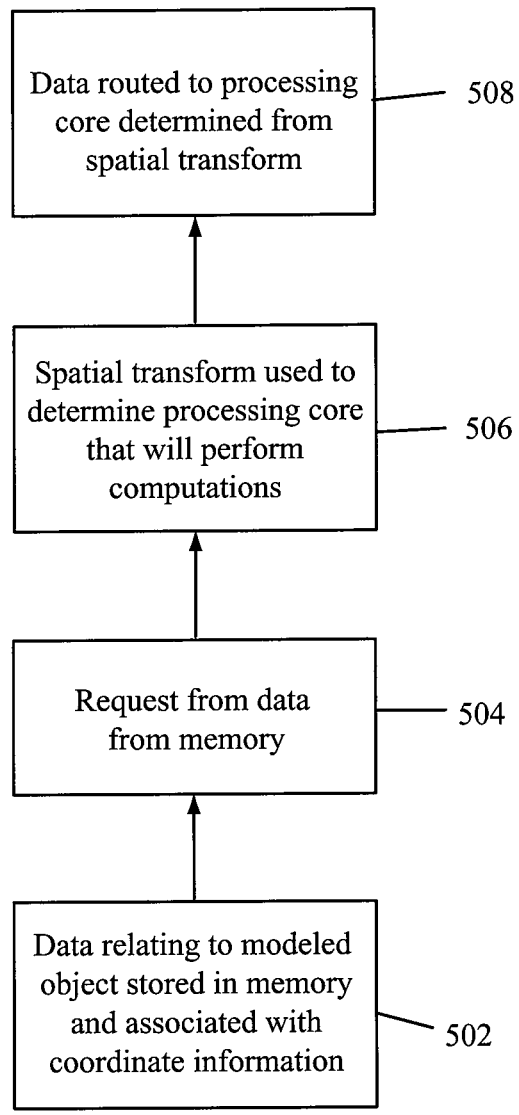
FIG. 5 is an example flow diagram of a method for spatially mapped processing according to an illustrative embodiment of the present disclosure.

FIG. 5 illustrates a flow diagram of an illustrative embodiment of a method for spatially mapped processing according to the present disclosure. As shown in step 502, in one embodiment, data relating to an object, or portion of an object, being modeled may be stored in memory and associated with coordinate information relating to the physical position, real or artificial, of the object, or portion of the object. In step 504, data from the memory may requested by the multicore processor. In step 506, a spatial transform may be used to calculate or otherwise determine, from the physical coordinates, the processing core(s) that will perform the computations or processing required for that object or portion of the object. In some embodiments, a front end processor, such as but not limited to the core controller 116 described above, may be used to determine the spatial transform. In step 508, the data requested for the computations or processing can be routed through a network of cores to the processing core(s) determined from the spatial map. In one embodiment, network switches can be used to route the data.

Figure 6:
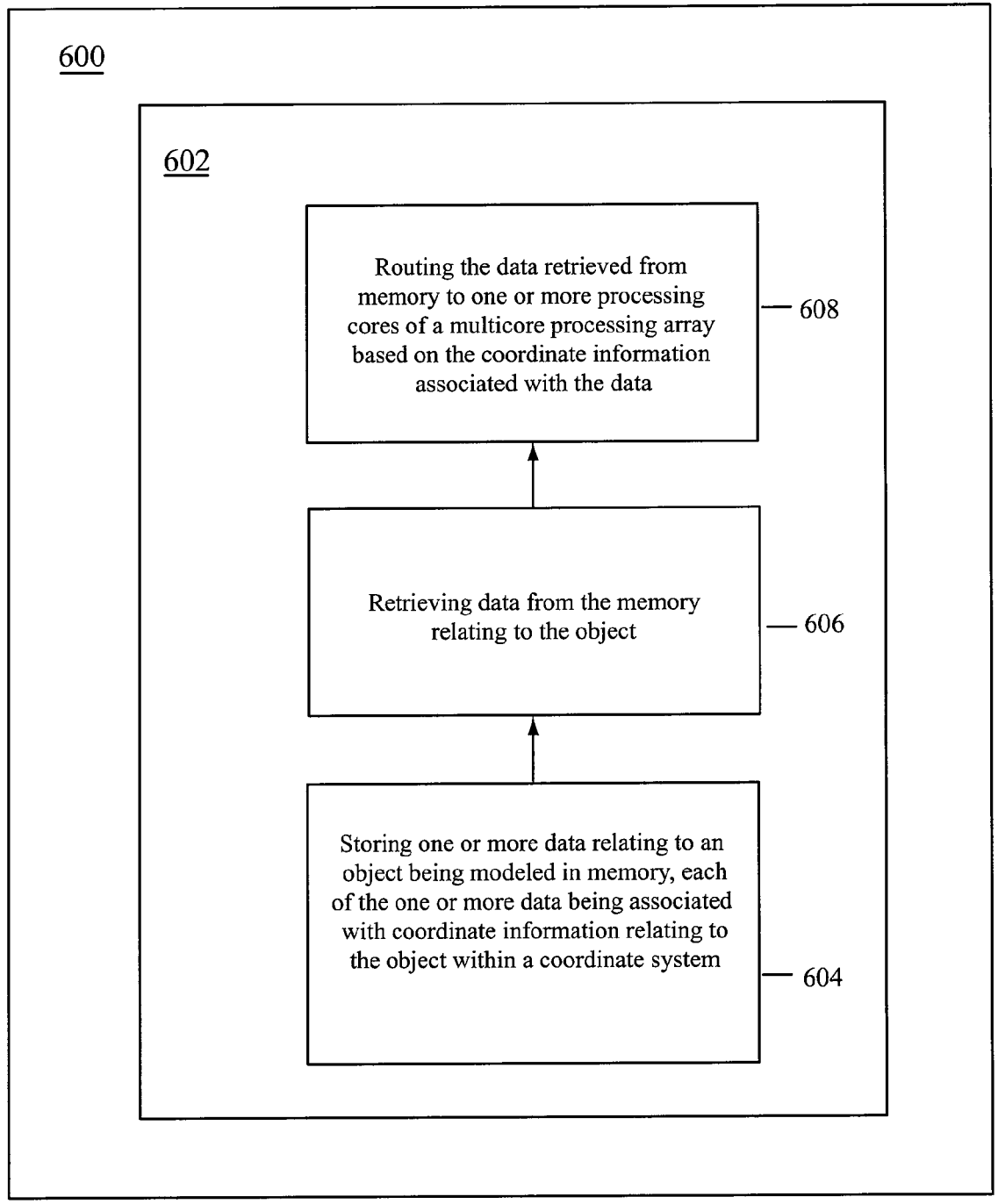
FIG. 6 is a schematic of a system for performing a method for spatially mapped processing according to an illustrative embodiment of the present disclosure.

In one particular embodiment, as shown in the schematic of FIG. 6, a computer system 600 may include a processor 602 configured for performing an embodiment of a method for routing data across a multicore processing network. In other embodiments, various steps or portions of various steps of the method may be performed outside of the processor 602. In step 604 the method may include storing one or more data relating to an object being modeled in memory, each of the one or more data being associated with coordinate information relating to the object within a coordinate system. In step 606, the method may include retrieving data from the memory relating to the object. In step 608, the method may include routing the data retrieved from memory to one or more processing cores of a multicore processing array based on the coordinate information associated with the data.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system to route data for an object being modeled across a multicore processor network, the system comprising:
    a multicore processor array including a plurality of processor cores;
    a memory to store data including:
        at least three dimensional coordinate information that identifies modeled predictive changes of a spatial location of a portion of the object being modeled within a coordinate system; and
        object data related to the portion of the object being modeled; and
    a controller configured to provide a spatial transform to transform the modeled, predictive changes of the at least three dimensional coordinate information to routing information that relates to one or more of the plurality of processor cores and further configured to route the object data from the memory through a network of switches that interconnect two or more of the processor cores of the multicore processor array to the one or more of the plurality of processor cores of the multicore processor array based on the routing information, wherein the routing information defines a path through the network of switches that the object data will be routed from the memory to the one or more of the plurality of processor cores.

2. The system of claim 1, wherein the modeled, predictive changes are based on real world changes of the object being modeled.

3. The system of claim 2, wherein the at least three dimensional coordinate information comprises more than three dimensions.

4. The system of claim 3, wherein one of the at least three dimensions includes time, and wherein the routing information is time dependent, such that routing to one or more processor cores changes over time.

5. The system of claim 1, wherein the object being modeled includes an object in a physics simulation, and wherein the controller is configured to change routing of the object data as a physical location of the portion of the object changes in the physics simulation.

6. The system of claim 1, further comprising one or more image sensors configured to capture the object data.

7. The system of claim 1, wherein the at least three dimensional coordinate information represents a real-world physical location of the portion of the object, and wherein the controller is configured to route the object data to respective processor cores based on the at least three dimensional coordinate information that represents the real-world physical location.

8. The system of claim 1, further comprising a display device configured to display the object to be modeled, wherein the spatial location is independent of a location on the display device.

9. The system of claim 1, wherein the plurality of processor cores are spatially mapped to a respective part of the coordinate system such that each of the processor cores is configured to process the object data related to the portion of the object being modeled that falls within the respective part of the coordinate system mapped to that processor core.

10. A method to route data for an object being modeled across a multicore processor network, the method comprising:
storing one or more data, each of the one or more data including:
at least three dimensional coordinate information that identifies a spatial location of a corresponding portion of the object being modeled within a coordinate system; and
object data related to the corresponding portion of the object being modeled;
retrieving the object data of the one or more data;
spatially transforming the at least three dimensional coordinate information to routing information that relates to one or more processor cores of a multicore processor array; and
routing the retrieved object data of the data to the one or more processor cores of the multicore processor array using a network of switches that interconnect two or more of the processor cores of the multicore processor array based on modeled, predictive changes to the at least three dimensional coordinate information of the data, wherein the routing is time dependent as a result of a model predicting how the coordinate information of the object data changes with time, and wherein the routing information defines a map to route the retrieved object data through the network of switches to the two or more processor cores of the multicore processor array.

11. The method of claim 10, further comprising routing the object data from the memory to a sequence of the one or more of the plurality of processor cores of the multicore processor array based on time dependent modelling of the coordinate information.

12. The method of claim 11, wherein the routing information that relates to one or more processor cores of the multicore processor array changes over time.

13. The method of claim 10, wherein the object being modeled includes an object in computational photography, and routing of object data changes as a physical location of the portion of the object changes in the computational photography.

14. The method of claim 10, wherein the spatial location comprises a real-world physical location of the portion of the object, wherein routing the retrieved object data to the one or more processor cores of the multicore processor array based on the at least three dimensional coordinate information includes routing the retrieved object data to the one or more processor cores based on the real-world physical location of the portion of the object.

15. A non-transitory computer accessible medium that includes computer executable instructions stored thereon to perform a procedure to route data for an object being modeled across a multicore processor network, the procedure comprising:
retrieving, from a memory, data that includes:
at least three dimensional coordinate information that identifies a spatial location of a portion of the object being modeled within a coordinate system; and
object data related to the portion of the object being modeled;
transforming the at least three dimensional coordinate information with a spatial transformation to designate one or more processor cores of a multicore processor array;
mapping the designated one or more processor cores of the multicore processor array to a sequence of switches; and
routing the object data retrieved from the memory to the one or more processor cores of the multicore processor array based on the mapped sequence of switches, and further based on time dependent modeled, predictive changes to the at least three dimensional coordinate information of the object.

16. The non-transitory computer accessible medium of claim 15, wherein the time dependent modeled, predictive changes are based on real world changes captured by an array of image sensors.

17. The non-transitory computer accessible medium of claim 15, wherein the routing to one or more processor cores changes over time.

18. The non-transitory computer accessible medium of claim 15, wherein the object being modeled includes an object of a real-time control application, and routing of the object data changes as a physical location of the object changes.

19. An apparatus to route data for an object being modeled, the apparatus comprising:
a multicore processor array including a plurality of processor cores configured to process data, the data including:
at least three dimensional coordinate information that identifies a spatial location of a portion of the object being modeled within a coordinate system; and
object data related to the portion of the object being modeled; and
a controller configured to provide a spatial transform to transform modeled, predictive changes to the at least three dimensional coordinate information to routing information that relates to one or more of the plurality of processor cores and further configured to route the object data to the one or more of the plurality of processor cores of the multicore processor array based on the routing information, wherein the controller comprises:
a transform logic configured to transform the at least three dimensional coordinate information into information that designates one or more processor cores of the plurality of processor cores;
a core mapper logic configured to transform the information that designates the one or more processor cores of the plurality of processor cores into the routing information, wherein the routing information determines a path of switches to the one or more designated processor cores of the plurality of processor cores; and a switch control to control the switches in the path of switches based on the routing information.

20. The apparatus of claim 19, wherein the plurality of processor cores are spatially mapped to respective parts of the coordinate system, wherein the portion of the object falls within at least one of the respective parts of the coordinate system, and wherein each of the processor cores is configured to process the object data related to the portion that falls within the at least one of the respective parts that is mapped to that processor core.

21. The apparatus of claim 19, wherein the controller is further configured to route the object data to one or more of the plurality of processor cores of the multicore processor array based on changes to the at least three dimensional coordinate information of the object being modeled.

22. The apparatus of claim 19, wherein the core mapper logic is configured to determine the routing information based on a look up table.

* * * * *

UNITED STATES PATENT AND TRADEMARK OFFICE
CERTIFICATE OF CORRECTION

| | | |
|---|---|---|
| PATENT NO. | : 8,854,379 B2 | Page 1 of 1 |
| APPLICATION NO. | : 12/392903 | |
| DATED | : October 7, 2014 | |
| INVENTOR(S) | : Conte et al. | |

It is certified that error appears in the above-identified patent and that said Letters Patent is hereby corrected as shown below:

On the title page, item (56), under "OTHER DOCUMENTS", in Column 2, Line 1, delete "J.D.; ," and insert -- J.D., --, therefor.

On Page 2, item (56), under "FOREIGN PATENT DOCUMENTS", in Column 2, Line 3, delete "8/1990" and insert -- 10/1991 --, therefor.

In the Specification

In Column 3, Line 41, delete "may cases," and insert -- many cases, --, therefor.

In the Claims

In Column 10, Line 37, in Claim 1, delete "modeled" and insert -- modeled, --, therefor.

Signed and Sealed this
Seventeenth Day of March, 2015

Michelle K. Lee
*Director of the United States Patent and Trademark Office*